United States Patent
Schenk et al.

(10) Patent No.: US 10,179,978 B2
(45) Date of Patent: Jan. 15, 2019

(54) RAIL SYSTEM, FOR AN ELECTRICAL PALLET CONVEYOR SYSTEM

(71) Applicant: EISENMANN SE, Boeblingen (DE)

(72) Inventors: Konstantin Schenk, Leinfelden (DE); Mario Lutz, Schoenaich (DE); Gerrit Van Der Vlist, Stuttgart (DE); Dominik Jaekle, Saabruecken (DE)

(73) Assignee: EISENMANN SE, Boeblingen (DE)

( * ) Notice: Subject to any disclaimer, the term of this patent is extended or adjusted under 35 U.S.C. 154(b) by 256 days.

(21) Appl. No.: 15/306,134

(22) PCT Filed: Apr. 1, 2015

(86) PCT No.: PCT/EP2015/000715
§ 371 (c)(1),
(2) Date: Oct. 24, 2016

(87) PCT Pub. No.: WO2015/161916
PCT Pub. Date: Oct. 29, 2015

(65) Prior Publication Data
US 2017/0044722 A1 Feb. 16, 2017

(30) Foreign Application Priority Data
Apr. 25, 2014 (DE) .................. 10 2014 006 023

(51) Int. Cl.
*E01B 23/06* (2006.01)
*E01B 7/00* (2006.01)
(Continued)

(52) U.S. Cl.
CPC .............. *E01B 23/06* (2013.01); *B65G 47/64* (2013.01); *E01B 7/00* (2013.01); *E01B 7/14* (2013.01); *E01B 2202/025* (2013.01)

(58) Field of Classification Search
CPC ... E01B 7/00; E01B 7/14; E01B 23/06; E01B 2202/025
(Continued)

(56) References Cited

U.S. PATENT DOCUMENTS 1,253,800 A * 1/1918 English .................. E01B 25/00
104/130.06
2,688,933 A * 9/1954 Spafford ............... B61L 23/005
104/130.06
(Continued)

FOREIGN PATENT DOCUMENTS

DE 20 2008 006 023 U1 9/2008
DE 20 2008 010 439 U1 2/2009
(Continued)

*Primary Examiner* — Zachary L Kuhfuss
(74) *Attorney, Agent, or Firm* — Schroeder Intellectual Property Law Group, LLC

(57) ABSTRACT

Rail system for an electrical pallet conveyor system, having a switch point which is arranged between a main track and a plurality of secondary tracks and which includes a plurality of moving rail sections. Depending on their position, the rail sections are able to connect the main track to the secondary tracks. The moving rail sections which are associated with one rail of the main track are in this case mounted on a first moving slide, and the moving rail sections which are associated with the second rail of the main track are mounted on a second moving slide which can move independently of the first slide. A dedicated drive which can be separately actuated by a control device is associated with each slide.

4 Claims, 2 Drawing Sheets

(51) Int. Cl.
*B65G 47/64* (2006.01)
*E01B 7/14* (2006.01)

(58) Field of Classification Search
USPC .................................................... 104/130.06
See application file for complete search history.

(56) References Cited

U.S. PATENT DOCUMENTS

| | | | | |
|---|---|---|---|---|
| 2,840,006 | A | * | 6/1958 | Henderson ............ B61L 23/002 104/102 |
| 3,735,709 | A | * | 5/1973 | Matsumoto ........... B61L 23/005 104/130.06 |
| 3,905,302 | A | * | 9/1975 | Fink ........................ E01B 25/34 104/130.03 |
| 3,927,619 | A | * | 12/1975 | Bradley ................... B61B 3/00 104/130.06 |
| 4,109,584 | A | | 8/1978 | Mihirogi |
| 8,302,534 | B2 | | 11/2012 | Meinzinger |
| 8,398,031 | B2 | | 3/2013 | Gawelczyk et al. |
| 2009/0188749 | A1 | | 7/2009 | Hong |
| 2010/0000440 | A1 | | 1/2010 | Meinzinger |
| 2011/0290145 | A1 | | 12/2011 | Gawelczyk et al. |
| 2012/0273624 | A1 | | 11/2012 | Meinzinger |

FOREIGN PATENT DOCUMENTS

| | | |
|---|---|---|
| EP | 2 390 413 A2 | 11/2011 |
| GB | 2 391 034 A | 1/2004 |

* cited by examiner

RAIL SYSTEM, FOR AN ELECTRICAL PALLET CONVEYOR SYSTEM

RELATED APPLICATIONS

This application is a national phase of International Patent Application No. PCT/EP2015/000715, filed Apr. 1, 2015, which claims the filing benefit of German Patent Application No. 10 2014 006 023.3, filed Apr. 25, 2014, the contents of both of which are incorporated herein by reference.

FIELD OF THE INVENTION

The invention relates to a rail system, in particular for an electrical pallet conveyor system, having
- a) a main track, which comprises at least two stationary parallel rails;
- b) at least two secondary tracks which form an angle and each have as many stationary parallel rails as the main track;
- c) a switch point arranged between the main track and the secondary tracks, which comprises:
  - ca) as many moving rail sections for each rail of the main track as there are secondary tracks, which are optionally able to connect the rails of the different secondary tracks to the rails of the main track, directly or indirectly, depending on their position.
  - cb) at least one moving slide, on which a plurality of moving rail sections are mounted;
  - cc) at least one drive for moving the slide;
  - cd) a control device which actuates the at least one drive.

BACKGROUND OF THE INVENTION

Whilst in the older prior art, points were frequently used which required the vehicle crossing the points to stop on the switch point during its adjustment, in more recent times there has been an increase in the use of continuously operating points where the vehicle can cross the points without stopping. The advantages of such continuously operating switch points are obvious: the throughput of vehicles through the rail system is greater since time is not required for braking, stopping and reaccelerating the vehicle in the region of the switch point.

A continuously operating switch point of the type referred to at the start is described in DE 20 2008 010 439 U1. Here, the moving rail sections, which are assigned to both rails of the main track, are all mounted together on a slide moving in a linear direction. The slide is in turn moved by a single drive. The disadvantage with this arrangement is firstly that different components, in particular different slides, have to be made available for different track gauges, and moreover, that relatively large masses have to be accelerated and braked when changing points, which can lead to undesirable vibrations if the rail system is mounted on a steel structure.

SUMMARY OF THE INVENTION

An object of the present invention is therefore to achieve a rail system of the type referred to at the start, which utilises a switching point that can be used with different track gauges and also demonstrates failure-free operation during adjustment.

This object may be achieved according to the invention in that
- d) the moving rail sections assigned to the first rails of the main track are mounted on a first moving slide and the moving rail sections assigned to the second rails of the main track are mounted on a second moving slide, which can be moved independently from the first slide;
- e) an individual drive is assigned to each slide, which can be actuated separately by the control device.

Therefore, in the rail system according to the invention, only components that can be designed independently of track gauge are used in the region of the switching point. Greater numbers of units can be achieved in this manner and stockholding simplified, which leads to lower costs overall. If adjustments need to be made in the case of different track gauges, this only happens on stationary rails or rail sections.

It is particularly preferred if the control device is programmed such that it actuates the drives of both the slides assigned to the main track at periodic intervals. In this manner, unlike in the case of DE 20 2008 010 439 U1 referred to at the start, relatively large masses do not start to move immediately when the points are changed, which then have to be slowed down generating corresponding vibrations. In fact, the scale of the masses accelerated or decelerated at a specific time is only half as great and therefore leads to fewer disruptive influences on the substructure than in the case of the cited prior art.

The periodic interval is advantageously between 0.5 and 1 second and naturally should be adjusted in individual cases.

A third slide is generally provided in the centre of switch points, which supports at least one moving rail section. According to the invention, this can also have an individual drive that can be actuated independently, wherein the interval can again be adjusted to the given circumstances based on the switching times of the other slides.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Embodiments of the invention are explained in more detail below using the drawings in which.

DETAILED DESCRIPTION OF THE PRESENT INVENTION

Figure 1:
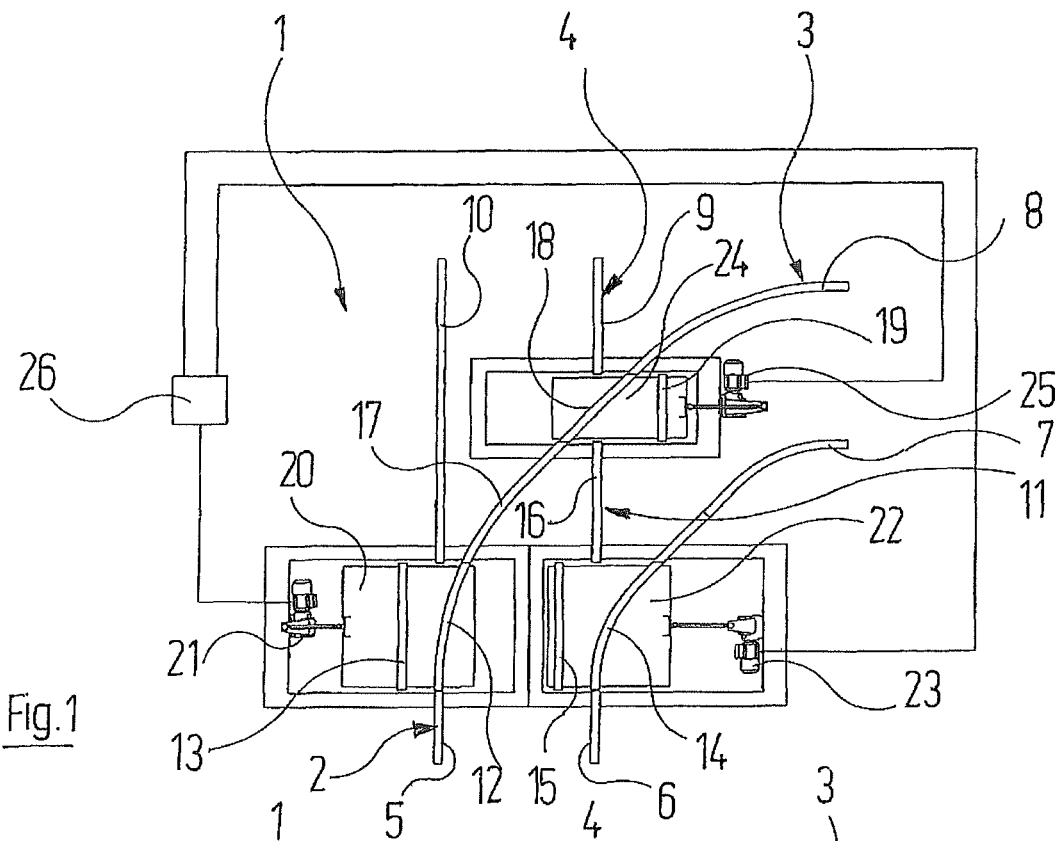
FIG. 1 shows a top view of a rail system with a switch point having a first track gauge in a first switch point position.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
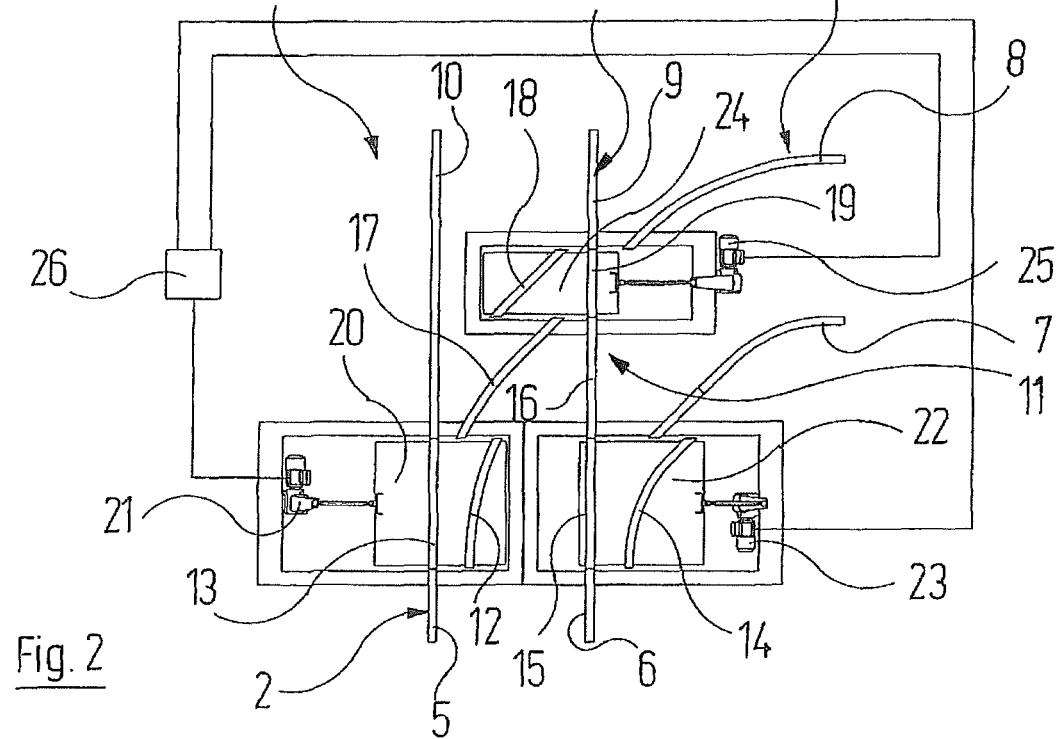
FIG. 2 shows a top view of the rail system in FIG. 1 in the other switch point position.

Reference is made firstly to FIGS. 1 and 2, which show a rail system which is denoted as a whole by the reference numeral 1 and which comprises a main track 2 and two secondary tracks 3, 4 in the in the detail shown. Each track 2, 3, 4 comprises two parallel rails 5, 6 and 7, 8, and 9, 10 respectively. The tracks 2, 3 and 4 and therefore also the rails 5, 6, 7, 8, 9, 10 are stationary. Whilst the secondary track 4 is located in the linear continuation of the main track 2, the secondary track 3 branches off from the other secondary track 4 at a particular angle.

The main track 2 can be connected optionally to the secondary track 3 or the secondary track 4 with the aid of a switch point denoted as a whole by the reference numeral 11. The switch point comprises two movable rail sections 12, 13 described in greater detail below, which are assigned to the rail 5, as well as two movable rail sections 14, 15, which are assigned to the rail 6. The rail section 12 here is curved such that, in one of the pivoted positions thereof (shown in FIG. 1), it can connect the end of the stationary rail 5 of the main track 2 to the end of a curved stationary intermediate rail section 17. The rail section 13 of the switch point 11 is linear and is of such a length that in one position of the switch point 11, i.e. the position shown in FIG. 2, it can connect the end of the stationary rail 5 of the main track 2 to the end of the stationary rail 10 of the secondary track 4.

The moving rail section 14, which is assigned to the rail 6 of the main track 2, has such a curvature and such a length that it connects the end of the rail 6 of the main track 2 to the end of the rail 7 of the secondary track 3 in one position of the switch point, as shown in FIG. 1. The linear moving rail section 15 of the switch point 11 finally has such a length that it can connect the end of the rail 6 of the main track 2 to the end of a stationary intermediate rail section 16 in a second position, as shown in FIG. 2.

The switch point 11 finally comprises a further moving rail section 18, which is linear in the embodiment shown and can connect the end of the stationary intermediate rail section 17 which faces the secondary track 4 to the end of the rail 8 of the secondary track 3 in the position of the switch point 11 as shown in FIG. 1. A further linear moving rail section 19 has such a length that it can connect the end of the stationary intermediate rail section 16 which faces the rail 9 to the end of the rail 9 of the secondary track 4 in the position of the switch point 11 as shown in FIG. 2.

The movable rail sections 12, 13, which are assigned to the rail of the main track 2, are mounted together on a sliding carriage 20[1], which can be moved between both the positions shown in FIG. 1 and FIG. 2 with the aid of a drive 21. Accordingly, the movable rail sections 14, 15, which are assigned to the stationary rail 6 of the main track 2, are mounted together on a sliding carriage 22[2], which can be moved between both the positions shown in FIG. 1 and FIG. 2 with the aid of a drive 23. Finally, in a corresponding manner, the movable rail sections 18, 19, which are assigned to the rail 8 of the secondary track 3 or rail 9 of the secondary track 4 respectively, are mounted on a common slide 24, which can be moved forwards and backwards between both the positions shown in FIG. 1 and FIG. 2 with the aid of a drive 25.

[1] Translator note: In the rest of the text, numerals 20 & 22 refer to the German "Schieber", translated as "slide" as per the published Abstract. Here the German "Schlitten" is used and so an alternative translation of "sliding carriage" has been used to reflect this.

[2] Translator note: See note 1

The switch point 11 is controlled by a control device 26, which sends control signals to the drives 21, 23 and 25 by means of the control cables shown. This takes place in particular in the following manner:

Assume that the rail system 1 and the switch point 11 are in the state as shown in FIG. 1, in which the main track 2 is connected to the secondary track 3. Now a change should be made to the state shown in FIG. 2, in which the main track 2 is connected to the secondary track 4. The control device 26 sends corresponding control signals to all three drives 21, 23, 25 for this purpose, which results in the necessary movement of the slides 20, 22, 24. The drives 21, 23 are, however, not actuated at exactly the same time, but after a certain delay, and consequently the slides 20, 22 are set in motion at different times. The advantage here is that the masses, which are connected to the slides 20, 22, are not accelerated at the same time, which could be linked to considerable jolts and vibrations of the substructure on which said moving parts are built. This applies in particular to cases where said substructure is a steel structure.

How long the delay needs to be must be determined according to the individual circumstances. Essentially, it should be as short as possible so as not to extend the cycle times of the switch point 11 unnecessarily. On the other hand, the period between the acceleration of the one slide 20 and the acceleration of the other slide 22 must be long enough to achieve the required chronological distribution of the increases in speed. In many cases, the suitable period is between half a second and a second.

Actuation of the drive 25, which is used to move the slide 24, can happen at the same time as the actuation of one of the other two drives 21, 23, or independently from said drives. A time can also be selected here, where appropriate, which does not match the actuation times of the other two slides 20, 22.

If the rail system 1 is changed again from the position shown in FIG. 2 to the position shown in FIG. 1, the control device 26 again sends corresponding signals to the drives 21, 23, 25 at the required intervals.

Figure 3:
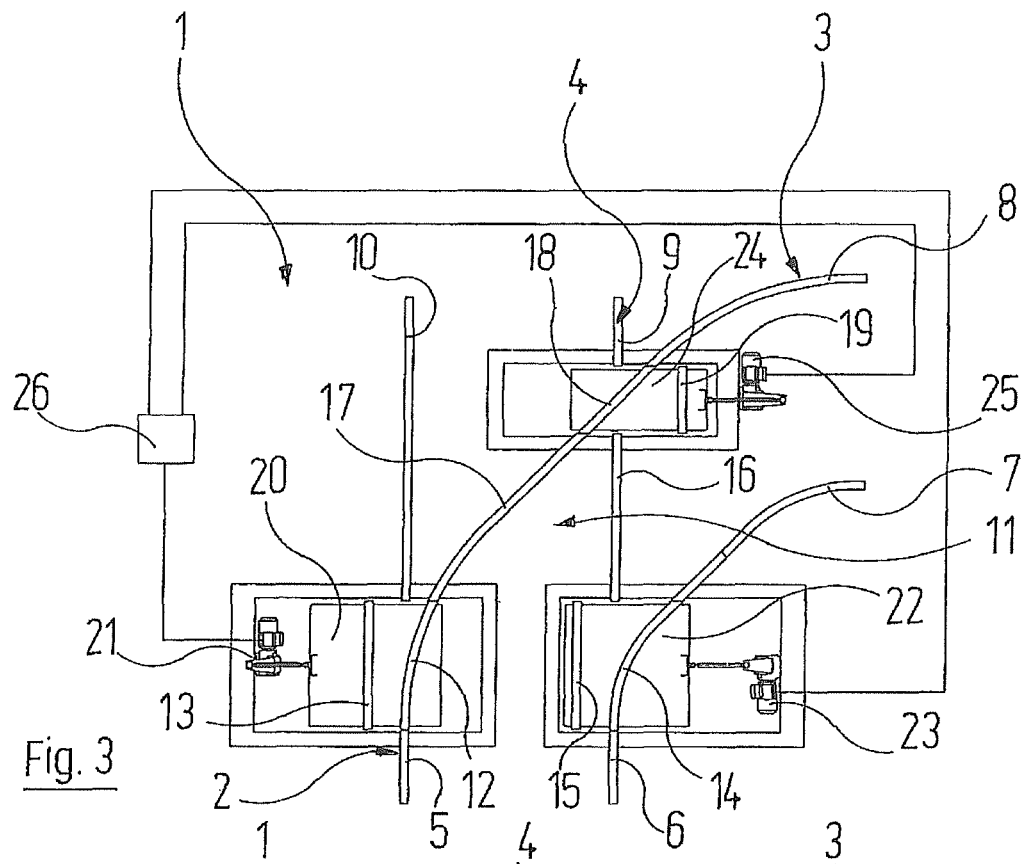
FIG. 3 shows a top view of a rail system with a switch point having a second track gauge in a first switch point position.
Figure 4:
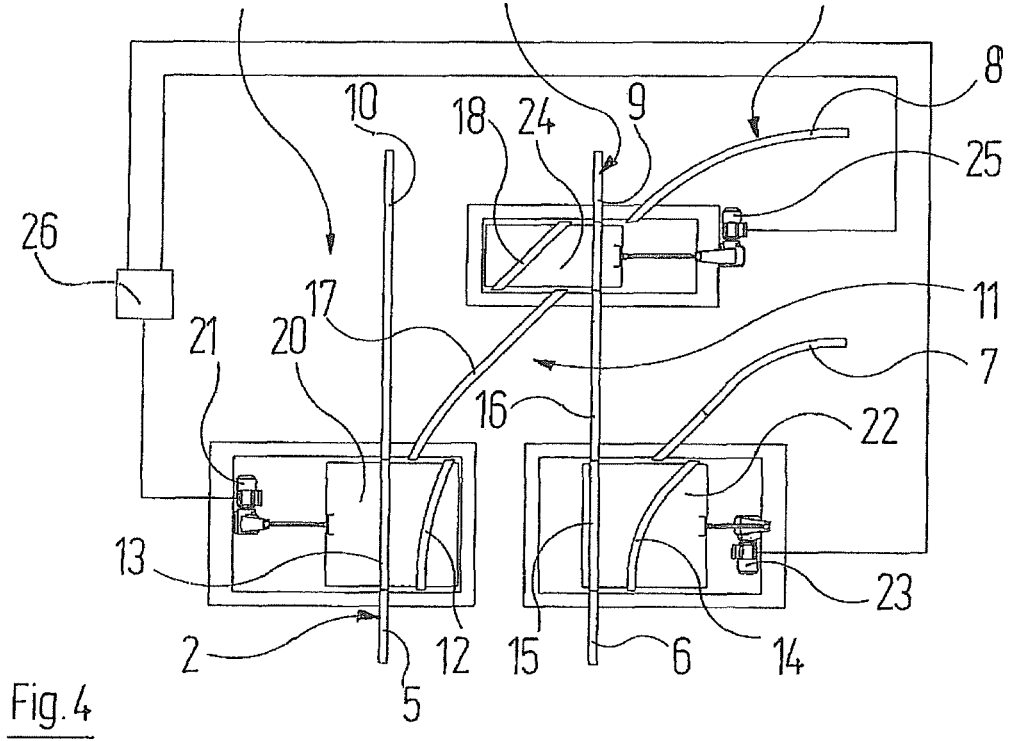
FIG. 4 shows a top view of the rail system in FIG. 3 in the other switch point position.

The distribution in pairs of the movable rail sections 12, 13, 14, 15, 18, 19 across three slides 20, 22, 24 has a further advantage: the slides 20, 22, 24 with the associated drives 21, 23, 25 and the rail sections 12, 13, 14, 15, 18, 19 attached thereto can be used for different track gauges of the rail system 1 without modification. This is shown in FIGS. 3 and 4 for a rail system 101, the track gauge of which is wider than the gauge of the rail system 1 in FIGS. 1 and 2. A more detailed description of said rail system 1 can be dispensed with as the functionality is exactly the same as the functionality of the rail system 1 as described above.

In the embodiment described above, linear movements of the different slides 20, 22, 24 are used. Naturally, pivoting movements are possible here too.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A rail system for an electrical pallet conveyor system comprising:

a) a main track, which comprises at least two stationary parallel rails;

b) at least two secondary tracks, which form an angle, each of the at least two secondary tracks having as many stationary parallel rails as the main track;
c) a switch point arranged between the main track and the at least two secondary tracks, the switch point comprising
   ca) as many moving rail sections for each rail of the main track as there are secondary tracks, the moving rail sections optionally being able to connect the parallel fails of the different secondary tracks to the at least two stationary parallel rails of the main track, directly or indirectly, depending on their position;
   cb) at least one moving slide, on which a plurality of the moving rail sections are mounted;
   cc) at least one drive for moving the at least one slide;
   cd) a control device, which actuates the at least one drive;
wherein
d) the moving rail sections assigned to a first rail of the main track are mounted on a first moving slide and the moving rail sections assigned to a second rail of the main track are mounted on a second moving slide, which can be moved independently of the first slide (20); and
e) an first individual drive is assigned to the first moving slide and a second individual drive is assigned to the second moving slide, wherein the first individual drive and the second individual drive can be actuated separately by the control device.

2. The rail system according to claim 1, wherein the control device is programmed such that the control device actuates the first individual drive and the second individual drive at periodic intervals.

3. The rail system according to claim 2, wherein the periodic interval is between 0.5 and 1 second.

4. The rail system according to claim 1, wherein a third moving slide is provided in a centre of the switch point, which supports at least one additional moving rail section and has a third individual drive that can be actuated independent of the first individual drive and the second individual drive.

* * * * *

UNITED STATES PATENT AND TRADEMARK OFFICE
CERTIFICATE OF CORRECTION

PATENT NO. : 10,179,978 B2
APPLICATION NO. : 15/306134
DATED : January 15, 2019
INVENTOR(S) : Schenk et al.

Page 1 of 1

It is certified that error appears in the above-identified patent and that said Letters Patent is hereby corrected as shown below:

In the Claims

In Column 5, Line 10   Please delete the word "fails" and insert instead -- rails --.

Signed and Sealed this
Sixteenth Day of April, 2019

Andrei Iancu
*Director of the United States Patent and Trademark Office*